(12) United States Patent
Chen et al.

(10) Patent No.: US 11,254,231 B2
(45) Date of Patent: Feb. 22, 2022

(54) CIRCUIT AND METHOD FOR DETECTING CONTROL PILOT ABNORMALITY OF A DC CHARGING PILE

(71) Applicant: PHIHONG TECHNOLOGY CO., LTD., Taoyuan (TW)

(72) Inventors: Chun Chen Chen, Taoyuan (TW); Jian-Hsieng Lee, Tainan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 107 days.

(21) Appl. No.: 16/833,868

(22) Filed: Mar. 30, 2020

(65) Prior Publication Data
US 2021/0237607 A1 Aug. 5, 2021

(30) Foreign Application Priority Data

Feb. 4, 2020 (TW) .................................. 109103401

(51) Int. Cl.
| | |
|---|---|
| *H02J 7/00* | (2006.01) |
| *H02J 7/14* | (2006.01) |
| *B60L 53/62* | (2019.01) |
| *B60L 53/22* | (2019.01) |
| *B60L 53/30* | (2019.01) |

(52) U.S. Cl.
CPC .............. *B60L 53/62* (2019.02); *B60L 53/22* (2019.02); *B60L 53/30* (2019.02); *H02J 7/0029* (2013.01)

(58) Field of Classification Search
USPC ................................................. 320/134, 109
See application file for complete search history.

(56) References Cited

U.S. PATENT DOCUMENTS

| | | | | |
|---|---|---|---|---|
| 2010/0289516 | A1* | 11/2010 | Mitsutani ................ | B60L 53/30 324/764.01 |
| 2011/0207358 | A1* | 8/2011 | Ichikawa ................ | B60L 53/16 439/345 |
| 2011/0279082 | A1* | 11/2011 | Hagenmaier, Jr. ...... | B60L 53/62 320/109 |
| 2012/0098490 | A1* | 4/2012 | Masuda .................... | B60L 3/04 320/109 |
| 2012/0133326 | A1* | 5/2012 | Ichikawa ................ | B60K 6/365 320/109 |
| 2013/0099740 | A1* | 4/2013 | Takashima .............. | B60L 53/14 320/109 |
| 2014/0015482 | A1* | 1/2014 | Nitzberg ................. | B60L 53/18 320/109 |

(Continued)

Primary Examiner — Alexis B Pacheco
(74) Attorney, Agent, or Firm — WPAT, PC (57) ABSTRACT

A hardware together with a software are used to implement a control pilot (CP) status detection for protecting a DC charging pile when errors happens, such as short circuit or open circuit, at CP point. The circuit for detecting the abnormality of the CP point includes a detection circuit, which is coupled to a CP signal generating circuit of the charging pile to provide an abnormal state detection when an electrical vehicle is electrically connected to the DC charging pile, and output the detected CP signal to a control circuit. It includes a DC voltage converter that converts a DC input voltage into two DC output reference voltage levels, a rectifier circuit to filter out the negative potential of the CP signal generating by the CP signal generating circuit, and a CP signal isolation circuit, connected to the rectifier circuit to provide isolated CP signals to the control circuit.

11 Claims, 6 Drawing Sheets

(56) References Cited

U.S. PATENT DOCUMENTS

2014/0077592 A1\* 3/2014 Koch ................ B60L 58/16
                                                   307/9.1
2016/0261127 A1\* 9/2016 Worry ............... H01M 10/425
2016/0272074 A1\* 9/2016 McGrath ............ B60L 53/14

\* cited by examiner

CIRCUIT AND METHOD FOR DETECTING CONTROL PILOT ABNORMALITY OF A DC CHARGING PILE

TECHNICAL FIELD

The present invention relates to a DC charging pile, and more particularly, a circuit and method for a detecting control pilot abnormality of a DC charging pile.

BACKGROUND

In response to international environmental protection and carbon reduction trends, developed countries have accelerated the development of electric vehicle technology and are committed to the vision of no longer producing fuel vehicles in the next few decades. Compared with traditional fuel vehicles, pure electric vehicles have many advantages, which are not listed here one by one, but there is one drawback of pure electric vehicles, that is the length of charging time and battery life of the electric vehicles. For electric vehicles, it is difficult to unilaterally optimize the charging time or battery life, because the battery life is related to the charging rate. Generally, the larger the charging and discharging rates are applied, the smaller the number of charging cycles can last. To ensure that the battery can be recharged between 800 and 1000 times, the battery's charging rate should usually be between 0.5 C and 0.25 C. It is powered by the national grid and uses a on board charger (OBC) to charge power batteries, the public facilities for this charging solutions are AC charging piles. In case of an emergency, the battery of a electrical vehicle should be able to be charged to 80% of the maximum capacity within 15-30 minutes, and the corresponding charging rate should be between 2 C and 4 C. This is a fast charging scheme and the supporting public facilities are DC charging pile.

As electric vehicles and charging pile systems become more diverse, interoperability between different components and consistency of charging standards will become more important. To confirm the source of interruption in the charging process and perform reliability and robustness tests for various interferences, it is necessary to perform a consistency coverage test in an open test system. Matching issues existing between different charging components of many car manufacturers, the Charging Interface Initiative (CharINe. V.), as an open agreement of important global electric vehicle manufacturers, develops and establishes various electric vehicle charging standards to improve the convenience and efficiency of charging infrastructure. There are currently three types of charging agreement standards, each has charging interface, such as the use of Combined Charging System (CCS) in Europe and North America, GB/T27930 and GB/T18487 in China, and CHAdeMO in Japan.

Take the Combined Charging System (CCS) as an example, which only requires one charging interface on the vehicle, allowing customers to charge the vehicle using all existing charging methods: single-phase alternating current (AC) charging, fast three-phase AC charging, and direct current (DC) charging at home/Ultra-fast DC charging at a public charging station. Among them, the charging process in accordance with the IEC 61851 standard of the Combined Charging System (CCS) standard defines four charging modes for electric vehicles:

mode 1: single-phase power charging, with maximum current 16 A, no pilot signals been provided.

mode 2: single/three-phase power charging, with maximum current 32 A, and having pilot signals provided.

mode 3: single/three-phase power for charging, with maximum current 63 A, and having pilot signals provided by the charging pile.

mode 4: DC charging up to 400V/125 A.

Mode 1 does not involve the communication between the vehicle and the charging infrastructure, such as the charging station/pile, but in the charging modes 2, 3, and 4 which are based on the pulse width modulation (PWM) signal and performs the lower-layer communication through the CP (Control Pilot) connection. If the vehicle and the charging station support upper-layer communication at the same time, the signal must be modulated into a PWM signal according to the Home Plug GreenPHY standard, that is, Power Line Communication (PLC). In principle, all PLC-based charging communications require transmission via PWM. Therefore, a complete test system must be able to handle both communication modes.

This application aims to develop a detection technology of abnormal control pilots (Control Pilot, CP) when the combined charging system (CCS, Combined Charging System) charging interface is used. How to determine current status of the control pilot signals at the CP points at different timings, while a DC charging pile is used to charge an electric vehicle in accordance with the CCS protocol. For example, instant detection and protection when a short-circuit or an open-circuit happened at the CP point during charging. Conventionally, a DC charging pile is used to charge an electric vehicle in accordance with the CCS protocol, as the status of the CP point changes, a Modem installed on the DC charging pile detects and transmits the status of the CP point together with its software. However, in some situations where the Modern's response time cannot catch up the reaction of the hardware of the DC charging pile, which may lead to errors, causing that the DC charging pile cannot be immediately protected. To prevent this from happening, in this application, a hardware together with a software are proposed to implement a control pilot (CP) status detection for protecting a DC charging pile when errors happen, such as a short circuit or an open circuit, at CP point.

SUMMARY OF THE INVENTION

The purpose of the present invention is to provide a circuit and a method for detecting a control pilot abnormality of a DC charging pile.

The circuit for detecting control pilot abnormality of a DC charging pile, where the DC charging pile comprises a power supply device to provide power to a power storage unit of a electrical vehicle and a charging device configured to control energy transfer from the power supply device to the electrical vehicle. The charging device includes a control circuit, a communication unit controlled by the control circuit to establish communication with the electrical vehicle, and a control pilot signal generating circuit for generating control pilot signals to a vehicle control circuit of the electrical vehicle, wherein the circuit for detecting control pilot abnormality of the DC charging pile includes a detection circuit electrically coupled to the control pilot signal generating circuit and the control circuit for providing control pilot abnormality detection while the electrical vehicle being connected to the DC charging pile and outputting the detected control pilot signal to the control circuit. The detection circuit includes a DC converter for converting a DC input voltage into two DC output reference voltage levels, which represents a first reference voltage level and a second voltage level respectively, a rectifier circuit electrically coupled to the control pilot signal generating circuit for filtering out negative voltage signal of the generated control pilot signals generated by the control pilot signal isolation circuitry, a control pilot signal isolation circuitry electrically coupled to the DC converter and the rectifier circuit for providing isolated control pilot signals to the control circuit.

In one preferred embodiment, the charging device is configured to provide a control pilot signal to the vehicle control circuit of the electrical vehicle upon the connection of the electrical vehicle to the DC charging pile, measure the voltage level of the control pilot signal upon the connection of the electrical vehicle to the DC charging pile, perform a pre-charge test based on the measured voltage level of the control pilot signal, and enable charging of the electrical vehicle from the power supply device upon the pre-charge test that was performed.

In one preferred embodiment, the control pilot signal isolation circuitry includes a first comparator with its input terminals coupled to the DC converter and the rectifier circuit, its output terminal coupled to a first optocoupler, for comparing the received filtered control pilot signal and the received first reference voltage level, and then outputting a first isolated control pilot signal, and a second comparator with its input terminals coupled to the DC converter and the rectifier circuit, its output terminal coupled to a second optocoupler for comparing the received filtered control pilot signal and the received second reference voltage level, and then outputting a second isolated control pilot signal.

In one preferred embodiment, the first optocoupler is a phototransistor or a photo-FET.

In one preferred embodiment, the second optocoupler is a phototransistor or a photo-FET.

In one preferred embodiment, the control circuit is a digital signal processor integral circuit, which can be a microprocessor, a microcontroller unit, or other similar integral circuits.

In one preferred embodiment, the control pilot signal generating circuit includes an oscillator generating circuit for generating oscillating control pilot signals.

In one preferred embodiment, the power supply device is a DC power unit.

In one preferred embodiment, the power storage unit includes at least one battery.

The method for detecting control pilot abnormality of a DC charging pile comprises providing a charging device configured to control energy transfer from a power supply device to the electrical vehicle, where the charging device includes a control circuit, a communication unit controlled by the control circuit to establish communication with the electrical vehicle, and a control pilot signal generating circuit for generating control pilot signals to a vehicle control circuit of the electrical vehicle, providing a detection circuit electrically coupled to the control pilot signal generating circuit and the control circuit for providing control pilot abnormality detection while the electrical vehicle being connected to the DC charging pile and outputting the detected control pilot signal to the control circuit, where the detection circuit includes a DC converter for converting a DC input voltage into two DC output reference voltage levels, which represents a first reference voltage level and a second voltage level respectively, a rectifier circuit electrically coupled to the control pilot signal generating circuit for filtering out negative voltage signal of the generated control pilot signals generated by the control pilot signal isolation circuitry, and a control pilot signal isolation circuitry electrically coupled to the DC converter and the rectifier circuit for providing isolated control pilot signals to the control circuit, wherein voltage level of the isolated control pilot signals been provided to the control circuit is determined by a software located inside the control circuit, which includes steps of: checking whether the voltage level of the isolated control pilot signals been input to the control circuit is normal, that is, the voltage level is 6V; checking whether the voltage level of the input isolation control pilot signal been input to the control circuit satisfies a first condition that the voltage level of the input isolation control pilot signal is greater than 10V or less than 2V; if the first condition is satisfied, within a first period of time notifies the control circuit to send a protection message out for protecting the DC charging pile; then, declaring an abnormal control pilot state; otherwise, checking whether the voltage of the isolated control pilot signal been input into the control circuit satisfies a second condition that the voltage level of the input isolation control pilot signal is between 2V and 10V, if yes, returns to the step of checking whether the voltage level of the isolated control pilot signals been input to the control circuit is normal; otherwise within the first period of time, notifies the control circuit to send a protection message out for protecting the DC charging pile; and then declaring the abnormal control pilot state.

In one preferred embodiment, the first period of time is 50 μs.

In one preferred embodiment, the protection message is sent out by an internal interrupt function of the control circuit.

BRIEF DESCRIPTION OF THE DRAWINGS

The components, characteristics and advantages of the present invention may be understood by the detailed descriptions of the preferred embodiments outlined in the specification and the drawings attached:

FIG. 1 (C) illustrates a control pilot circuit showing that a DC charging pile charges an electric vehicle according to a prior art.

FIG. 2 (A) illustrates a schematic diagram of a detection circuit provided in a system architecture of a DC charging pile for charging an electric vehicle according to a preferred embodiment of the present invention.

FIG. 2 (B) illustrates a detailed configuration diagram of a detection circuit provided in a DC charging pile according to a preferred embodiment of the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As described in the background section, present invention proposes a circuit and method for detecting control point abnormality of a DC charging pile. The hardware detection method mainly uses comparators to determine the CP point at different voltage levels. The software detection method mainly realizes the status of the CP point at the 5% PWM duty cycle. By combining the hardware as well as the software detection, the current working status of the CP point can be confirmed.

In general, both Europe and North America adopt a combined charging system (CCS, Combined Charging System) charging interface, which has pins based on SAE J1772 standard and add two additional DC fast charging pins, and uses IEC 61581 as the global specification for the charging interface of electric vehicles. It regulates the basic cross-control pilot connection electrical signal standard between charging piles and on board charger (OBC) electronic devices of electric vehicle. The above communication interaction is used to ensure the physical connection between the charging pile and electrical vehicle based on specific conditions, and to ensure the communication of power supply with chargeable capacity without safety concerns.

Figure 1A:
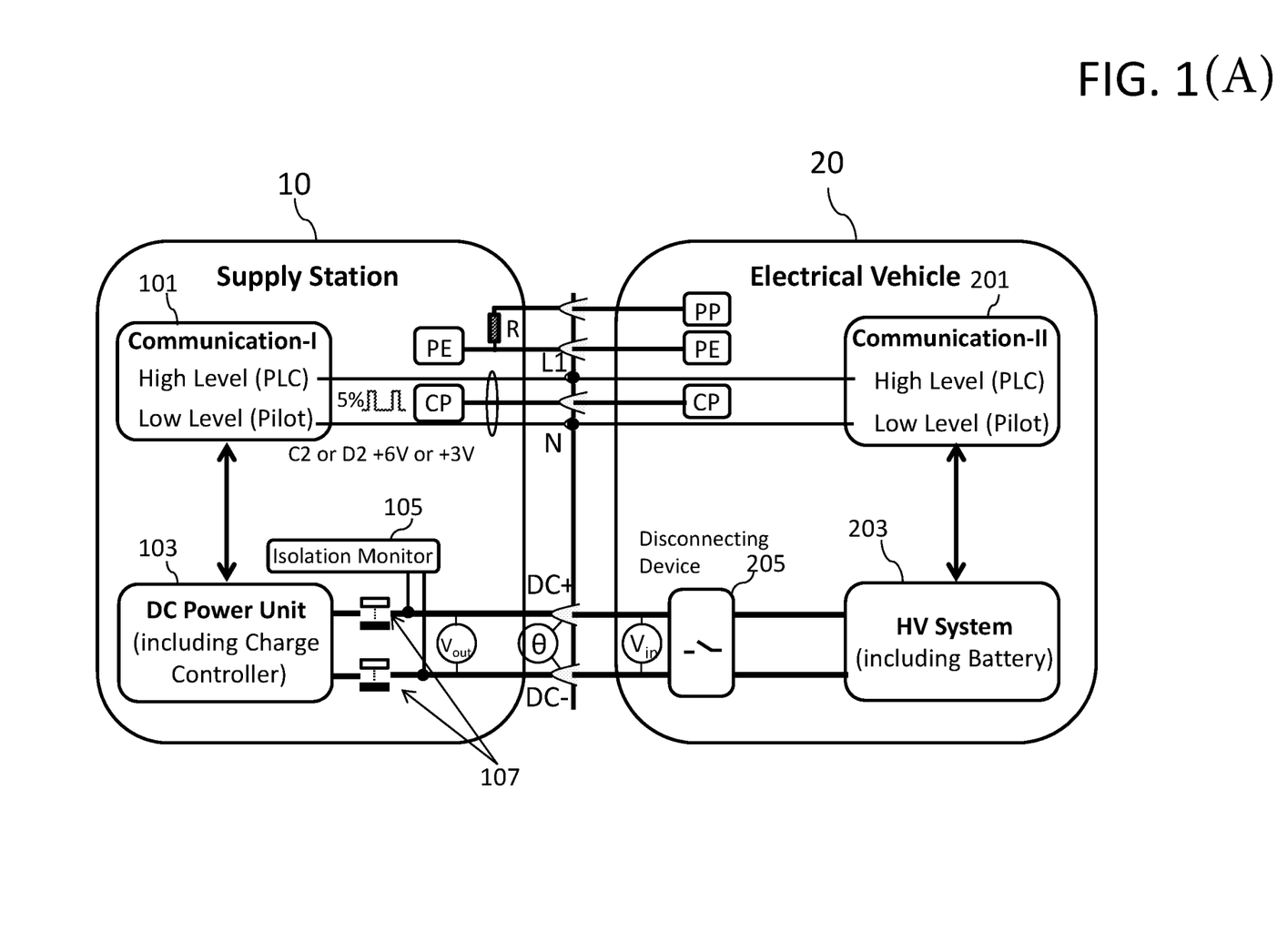
FIG. 1(A) illustrates a simplified system architecture of a DC charging pile for charging electric vehicles according to a prior art.

FIG. 1(A) depicts a simplified system architecture of a DC charging pile for charging electric vehicles. The DC charging pile 10 includes a first communication unit (Communication-I) 101, a DC power unit (including charge controller) 103, an isolation monitor 105, connection ports (PP, PE, CP, N, L1, DC+, and DC−), and a main switch/relay 107; the electric vehicle 20 includes a second communication unit (Communication-II) 201, a high voltage system (HV system, including battery) 203, a disconnecting device 205, and corresponding ports (PP, PE, CP, N, L1, DC+, DC−), where the power supply ports N and L1 are not shown in the figure. The above mentioned ports are shown in FIG. 1(B), among them PP indicates proximity pilot, PE indicates protective earth, CP indicates control pilot, N indicates neutral, L1 represents level 1 AC power, DC+ indicates a positive DC voltage pole, and DC− indicates a negative DC voltage pole.

The DC charging pile uses the Pulse Width Modulation (PWM) signals to justify the connection and power line supply statuses between the DC charging pile and the electric vehicle while charging. When the DC charging pile is charging according to the CCS protocol, the DC charging pile (supply station) 10 will generate a control pilot (CP) digital communication signal to start the charging sequence, signals at CP point will present different frequencies, duty cycles, and signal level differences according to various time sequences. Generally, a function or a test sequencing will be used in the DC charging pile 10 before charging processes started to enable test requests and check the order of required events/conditions, so that the electric vehicle 20 connected to the DC charging pile 10 will be sequentially tested and then charged. The test sequence is listed as follows: state A (the electric vehicle 20 is not connected to the DC charging post 10), +12V; state B (the electric vehicle is connected to the charging post, but not ready for charging), +9V; state C (the electric vehicle 20 is connected to DC charging pile 10, ready to be charged), +6V; state D (electric vehicle 20 is connected to the DC charging pile 10, ready to be charged, with ventilation requirements), +3V; and other states.

Figure 1B:
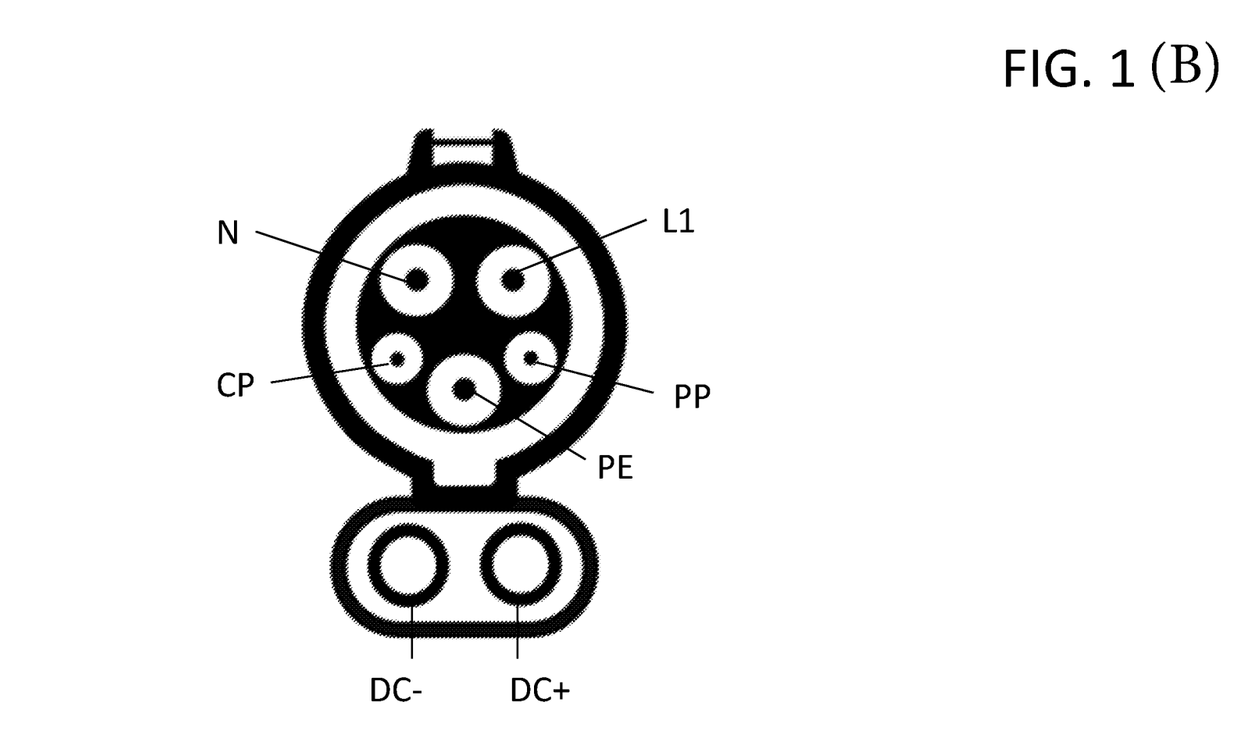
FIG. 1(B) illustrates layout of ports of the DC charging pile according to a prior art.
Figure 1C:
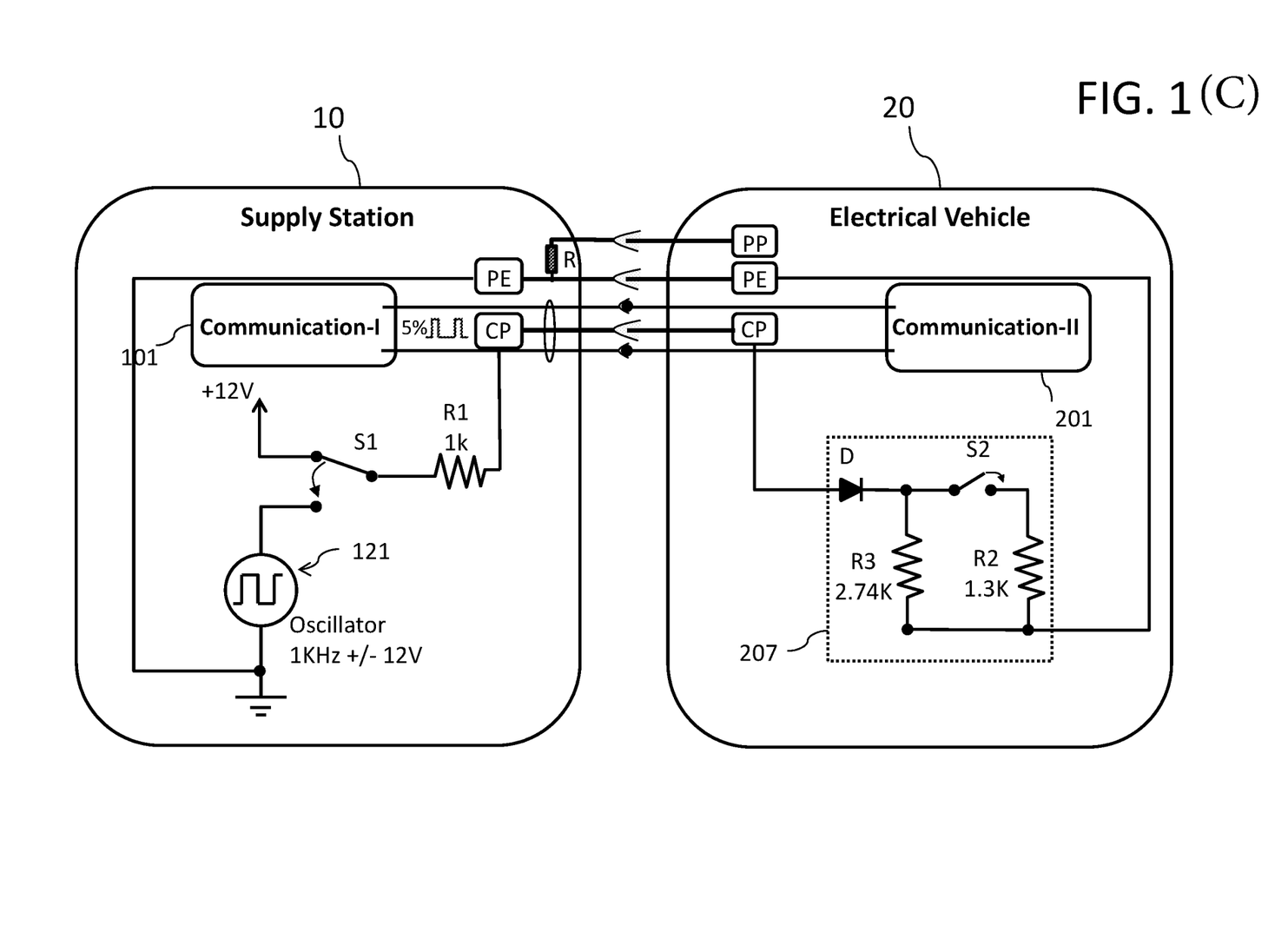

Please refer to FIG. 1 (C), which depicts a control pilot circuit showing that a DC charging pile charges an electric vehicle. In state A, the electric vehicle 20 has not yet been connected to the DC charging pile 10, while the switch S1 in the circuit of the DC charging pile 10 is connected to a +12V DC power. The detected voltage level at CP point is +12V (CP point is open). In state B, the electric vehicle 20 has been connected to the DC charging pile 10 but is not ready to be charged. At this moment, the oscillator generating circuit 121 in the DC charging pile 10 is connected to the switch S1, that is, to +12V (1 KHz, PWM signal), the switch S2 of control pilot circuit on the electric vehicle 20 side is opened. In this state, the voltage level of the CP point is +9V, which can be checked by analyzing the circuit loop formed by +12V (1 KHz, PWM signal), switch S1, resistor R1, CP, diode D, resistor R3, and PE. This loop forms a control pilot circuit, where the diode D, resistors R3 and R2, and PE forms a vehicle control circuit for confirming the compatibility between the DC charging pile 10 and electric vehicle 20. One example is that the DC charging pile 10 requires authorization (for example, from a RFID or a mobile phone) to allow charging started, but if such authorization has not been provided, the DC charging pile will not generate the oscillating control pilot signal. In state C, the DC charging pile 10 will be authorized to allow and enable charging. At this stage, the switch S1 of the control pilot circuit in the DC charging pile 10 is connected to the oscillator generating circuit 121 to generate oscillating control pilot signals (1 KHz +/−12V) and causes the switch S2 to be closed. By analyzing a loop formed by the control pilot signal (oscillating +/−12V), switch S1, resistor R1, CP, diode D, resistor R3//R2 (// means parallel coupled), and PE, i.e. control pilot circuit, the voltage level at the CP point drops to +6V. In state D, the electric vehicle 20 is connected to a DC charging pile 10, ready to be charged, and when ventilation is required (usually in fast charge mode), the pilot signal (oscillating +/−12V), the control pilot circuit, which is formed by switch S1, resistor R1, CP, diode D, R3//R2 (// means parallel coupled), and the PE, will coupled an additional 270Ω resistor in parallel, causing the voltage level at the CP point dropped to +3V.

Referring to FIGS. 1(A)-(C), after confirming that the DC charging pile 10 is connected to the electric vehicle 20, the PP port will be locked, enabling the charging ports of the electric vehicle 20 and their corresponding ports of the DC charging pile 10 been locked. The charging procedure according to the time sequence is as follows. Communication unit-I 101 on DC charging pile 10 and communication unit-II 201 on electric vehicle establish communications (PLC, CP communications) to communicate with each other for negotiating charging parameters and limitations, for example, when $V_{out}$>60V or incompatible conditions between the electric vehicle 20 and the DC charging pile 10 is detected, if any of these conditions happens, stop the charging process. When the electric vehicle 20 enters the state C/D from state B, at this moment, the DC charging pile 10 has entered the charging permission state. Isolation detection is performed on the high-voltage system 203 of the electric vehicle 20 and its isolation status is continuously reported. Once the DC charging pile 10 has successfully confirmed isolation and "approved", and then it responds with "Ready" to the communication unit-II 201 on the electric vehicle 20, and the charging circuit checking is then completed. Next, the electric vehicle 20 requests a pre-charging test, that is, the DC charging pile 10 is required to provide DC power with electric current less than 2 A. At this moment, the main switch/relay 107 on the DC charging pile 10 is closed. When $V_{out}$ is less than the allowable safety range, electric current is smaller than 2 A, and battery voltage at the electric vehicle 20 side is less than 20V, then the electric vehicle 20 closes the disconnection device 205, and allows charging (including fast charging) at the next stage. When a power down occurs, the electric vehicle 20 sends a request to the DC charging pile 10 for stopping the power output from the DC charging pile 10. After the electric current is less than 1 A, the electric vehicle opens the disconnection device 205, and then the DC charging pile opens the main switch/Relay 107.

Based on the prior arts described above, it is known that the CP signal actually plays a crucial role, it controls a series of tests and requests based on the orders of events/conditions that are required and must be satisfied in sequence, enabling the electric vehicles connected to the charging pile can be sequentially tested and start to be charged. As the CP signal directly plays an important role in the interpretation of the above-mentioned various conditions, it directly affects the overall performance and safety of the charging pile, therefore how to precisely detect the CP point voltage level is the most critical issue.

The present invention proposes a hardware (circuitry) and a software to implement the CP point voltage level detection of the DC charging pile, to realize a circuitry and related procedure for detecting abnormal conditions of the control pilot point (such as a short circuit or an open circuit at the CP point) in the DC charging pile, where the hardware (circuitry) detection mainly uses comparators to determine the CP point conditions at various voltage levels, and the software detection method mainly focus on realizing the state of the CP point at a 5% PWM duty cycle. By combining both hardware and software detections, current working status of the CP point can be confirmed.

Figure 2:
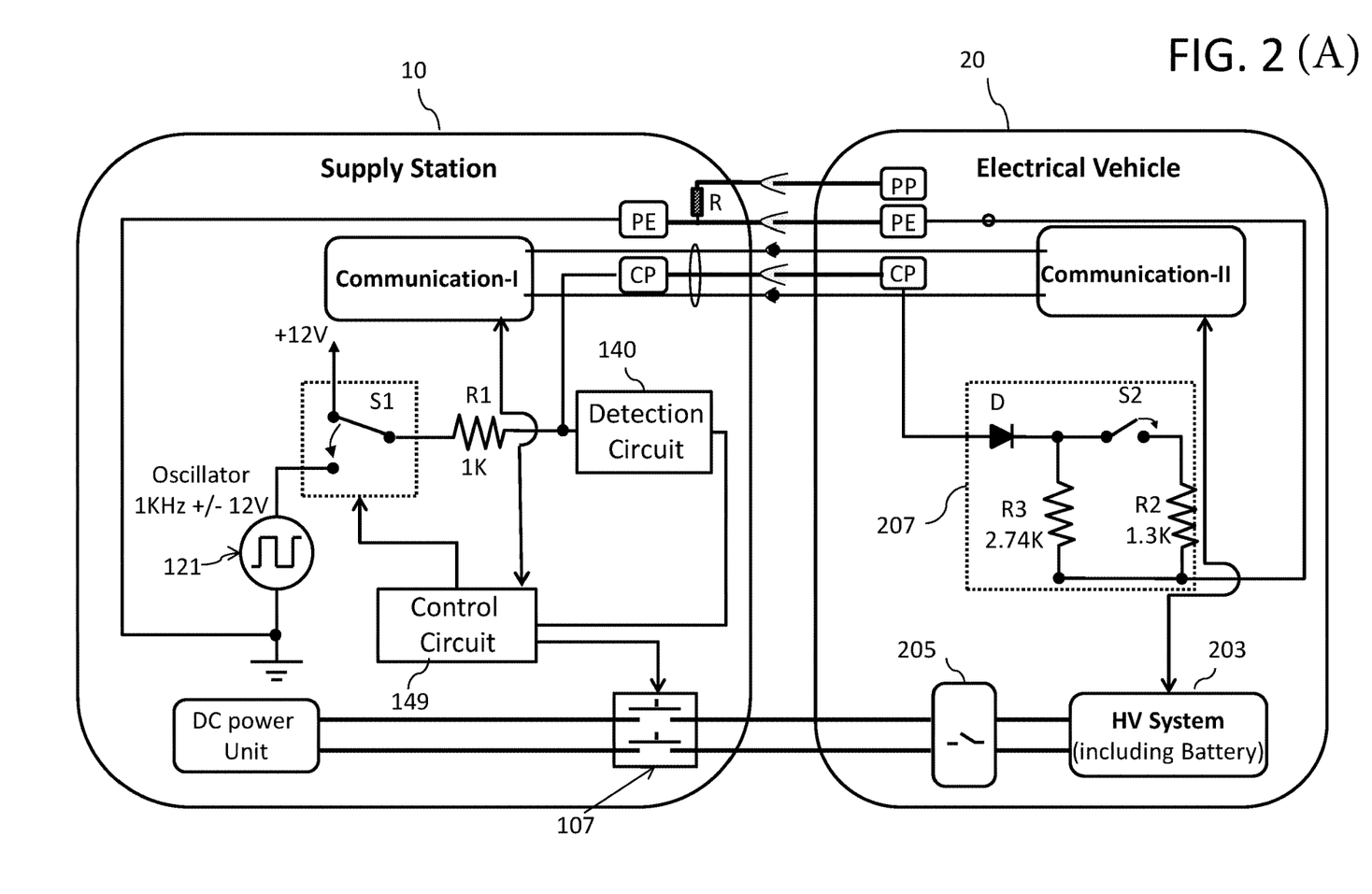

As shown in FIGS. 2(A)-(B), the present invention provides a detection circuit 140 for detecting the voltage level of the CP point on the control pilot circuit. As depicted in FIG. 2(A), a detection circuit 140 is electrically coupled to the oscillator generating circuit 121 (act as a CP signal generating circuit) via a resistor R1 and switch S1 for providing detection of abnormal CP signals while the electrical vehicle 20 is connected to the DC charging pile 10, and output detected CP signals to a control circuit 149. The control circuit 149 can control the action of switch S1 and the main switch/relay 107 based on the received CP signals, and can communicate with communication unit-I (communication-I) 101 as well. To realize the detailed implementation of the detection circuit 140, please refer to the FIG. 2(B), a DC voltage converter 141, which converts a DC +12V input voltage and generates two DC output reference voltage levels ($V_{ref1}$, $V_{ref2}$), electrically coupled to two comparators (145a, 145b), where each of these two reference voltage levels ($V_{ref1}$, $V_{ref2}$) is electrically connected to one of the two comparators individually acted as their reference input, the signal at the external CP point is branched and filtered by two rectifiers (143a, 143b) before been individually inputted into comparators (145a,145b), each of comparators (145a,145b) individually compares its filtered CP signal with their respective input reference voltage level ($V_{ref1}$, $V_{ref2}$) and outputs isolated CP signals via individually coupled optocouplers (147a, 147b). Because the reference ground level of the CP point is a floating ground (FG), an electrical isolated device, such as optocoupler, should be used in each CP signal path to isolate and pass the varying CP voltage levels to the control circuit 149. The configuration of the two comparators (145a, 145b) and optocouplers (147a,147b) mentioned previously can act as a CP signal isolation circuitry, which is configured to receive filtered CP signals and compare with specified reference voltage levels ($V_{ref1}$, $V_{ref2}$), then output separated isolated CP signals. In one preferred embodiment, the output of the first comparator 145a is electrically connected to the first optical coupler 147a, and the output of the second comparator 145b is electrically connected to the second optical coupler 147b. In one preferred embodiment, the above mentioned first and second optocouplers (147a, 147b), each of them can be a phototransistor or a photo-FET. In one preferred embodiment, the aforementioned control circuit 149 is a digital signal processor integrated circuit (DSP IC), such as a microprocessor, a microcontroller unit (MCU), or other similar ICs, for performing real-time detection of varying voltage levels output by the first and second optocouplers (147a, 147b). The above-mentioned DC voltage converter 141, the rectifier (143a, 143b), the first comparator 145a and second comparator 145b, and the first optical coupler 147a and the second optical coupler 147b respectively connected thereto constitute the detection circuit 141 (FIG. 2 (B)). The CP voltage levels that changed with time sequence are detected by the detection circuit 141 and then been fed into the control circuit 149, together with the use of a software to determine their current state (the implementation will be described in the next paragraph) for controlling the switch S1, the on/off states of the main switch/relay 107, notifying the control circuit 149 (DSP IC, etc.) to open the main switch/relay 107 in an emergency situation by using its internal interrupt function for emergency power shut down.

Figure 3:
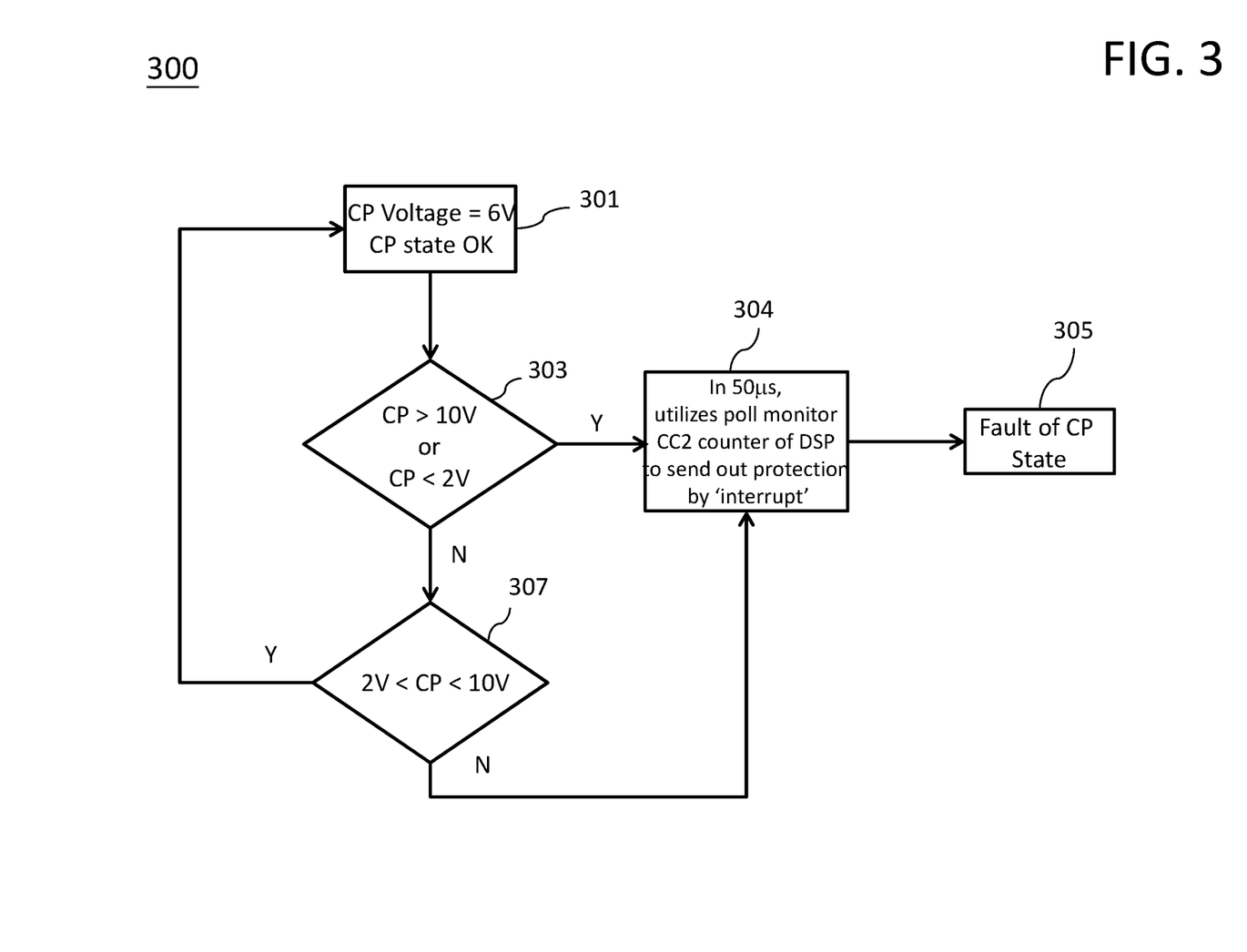
FIG. 3 illustrates the flow chart utilizing a hardware circuit (FIG. 2 (A)-(B)) and a software to determine the status of the control pilot point according to a preferred embodiment of the present invention.

In addition, due to the generation of duty cycle ratio (PMW) at different timings, this will cause some problems in CP signal detection. In order to supplement this deficiency, the present invention proposes to use the above hardware (FIGS. 2 (A-(B)) and a software simultaneously to determine the system's current status. A software implemented inside the control circuit (DSP IC) 149 can use an internal interrupt mechanism in the control circuit 149 to read the change in the voltage level of the CP point. If there is a continuous detection of the change in the voltage level a number of times, changes can truly reflect the current situation of CP point. The software implementation method can be realized with a flow chart shown in FIG. 3. A CP voltage is a PWM signal, the normal CP voltage level is 6V, when the CP voltage level is abnormal, i.e. outside the previous mentioned range of voltage level 9V, 6V or 3V, a short circuit, an open circuit and/or other problems may occur. When one of these happen, the control circuit (DSP IC) 149 is notified through the CP protection function of the hardware and the interrupt function inside the control circuit (DSP IC) 149 to send alarm signals within 50 μs to protect the DC charging pile 10. Specific implementation steps of the software discrimination method 300 (flow chart) for determining CP abnormality are as follows: step 301, detecting whether the voltage levels of the CP point of the DC charging pile is OK (the voltage level of the normal CP is 6V); then in step 303, checking if the condition of "CP>10V or CP<2V" is satisfied, if the condition is satisfied (Y) go to step 304, utilizing poll monitor CC2 counter of the control circuit (DSP IC) 149 to send out protection message by its internal interrupt function within 50 μs; then in step 305, displaying 'Fault of CP' state to protect the DC charging pile (emergency disconnection of main switch/relay), otherwise (N) proceed to step 307 to further determine whether the voltage at the CP point meets the condition that the voltage at the CP point is between 2V and 10V, if the condition is true then go back to step 301, otherwise go to step 304, utilizing poll monitor CC2 counter of the control circuit (DSP IC) 149 to send out protection message by its internal interrupt function within 50 μs; then in step 305 displaying 'Fault of CP' state to protect the DC charging pile (emergency disconnection of main switch/relay).

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A circuit for detecting control pilot abnormality of a DC charging pile, the DC charging pile comprising:
    a power supply device to provide power to a power storage unit of a electrical vehicle; and
    a charging device configured to control energy transfer from the power supply device to the electrical vehicle, the charging device including:
        a control circuit;
        a communication unit controlled by the control circuit to establish communication with the electrical vehicle; and
        a control pilot signal generating circuit for generating control pilot signals to a vehicle control circuit of the electrical vehicle;
        wherein the circuit for detecting control pilot abnormality of the DC charging pile includes a detection circuit electrically coupled to the control pilot signal generating circuit and the control circuit for providing control pilot abnormality detection while the electrical vehicle being connected to the DC charging pile and outputting the detected control pilot signal to the control circuit, the detection circuit includes:
            a DC converter for converting a DC input voltage into two DC output reference voltage levels, which represents a first reference voltage level and a second voltage level respectively;
            a rectifier circuit electrically coupled to the control pilot signal generating circuit for filtering out negative voltage signal of the generated control pilot signals generated by the control pilot signal isolation circuitry;
            a control pilot signal isolation circuitry electrically coupled to the DC converter and the rectifier circuit for providing isolated control pilot signals to the control circuit;
        wherein the control pilot signal isolation circuitry includes:
            a first comparator with its input terminals coupled to the DC converter and the rectifier circuit, its output terminal coupled to a first optocoupler, for comparing the received filtered control pilot signal and the received first reference voltage level, and then outputting a first isolated control pilot signal; and
            a second comparator with its input terminals coupled to the DC converter and the rectifier circuit, its output terminal coupled to a second optocoupler for comparing the received filtered control pilot signal and the received second reference voltage level, and then outputting a second isolated control pilot signal.

2. The circuit of claim 1, wherein the charging device is configured to:
    provide the control pilot signals to the vehicle control circuit of the electrical vehicle upon the connection of the electrical vehicle to the DC charging pile;
    measure voltage levels of the control pilot signals upon the connection of the electrical vehicle to the DC charging pile;
    perform a pre-charge test based on the measured voltage level of the control pilot signal; and
    enable charging of the electrical vehicle from the power supply device upon the pre-charge test that was performed.

3. The circuit of claim 1, wherein the first optocoupler is a phototransistor or a photo-FET.

4. The circuit of claim 1, wherein the second optocoupler is a phototransistor or a photo-FET.

5. The circuit of claim 1, wherein the control circuit is a digital signal processor integral circuit, which can be a microprocessor, a microcontroller unit, or other similar integral circuits.

6. The circuit of claim 1, wherein the control pilot signal generating circuit includes an oscillator generating circuit for generating oscillating control pilot signals.

7. The circuit of claim 1, wherein the power supply device is a DC power unit.

8. The circuit of claim 1, wherein the power storage unit includes at least one battery.

9. A method for detecting control pilot abnormality of a DC charging pile, the method comprising:
    providing a charging device configured to control energy transfer from a power supply device to the electrical vehicle, the charging device including:
        a control circuit;
        a communication unit controlled by the control circuit to establish communication with the electrical vehicle; and
        a control pilot signal generating circuit for generating control pilot signals to a vehicle control circuit of the electrical vehicle;
    providing a detection circuit electrically coupled to the control pilot signal generating circuit and the control circuit for providing control pilot abnormality detection while the electrical vehicle being connected to the DC charging pile and outputting the detected control pilot signal to the control circuit, the detection circuit includes:
        a DC converter for converting a DC input voltage into two DC output reference voltage levels, which represents a first reference voltage level and a second voltage level respectively;
        a rectifier circuit electrically coupled to the control pilot signal generating circuit for filtering out negative voltage signal of the generated control pilot signals generated by the control pilot signal isolation circuitry; and
        a control pilot signal isolation circuitry electrically coupled to the DC converter and the rectifier circuit for providing isolated control pilot signals to the control circuit;
    wherein the control pilot signal isolation circuitry includes:

a first comparator with its input terminals coupled to the DC converter and the rectifier circuit, its output terminal coupled to a first optocoupler, for comparing the received filtered control pilot signal and the received first reference voltage level, and then outputting a first isolated control pilot signal; and a second comparator with its input terminals coupled to the DC converter and the rectifier circuit, its output terminal coupled to a second optocoupler for comparing the received filtered control pilot signal and the received second reference voltage level, and then outputting a second isolated control pilot signal;

wherein voltage level of the isolated control pilot signals been provided to the control circuit is determined by a software located inside the control circuit, which includes steps of:

checking whether the voltage level of the isolated control pilot signals been input to the control circuit is normal, that is, the voltage level is 6V;

checking whether the voltage level of the input isolation control pilot signal been input to the control circuit satisfies a first condition that the voltage level of the input isolation control pilot signal is greater than IOV or less than 2V; and notifying the control circuit to send a protection message out for protecting the DC charging pile, and declaring an abnormal control pilot state if the first condition is satisfied, within a first period of time, otherwise returning to the step of checking whether the voltage level of the isolated control pilot signals been input to the control circuit is normal if the voltage of the isolated control pilot signal been input into the control circuit is between 2V and 10V, and otherwise within the first notifying the control circuit to send a protection message out for protecting the DC charging pile within the first period of time and then declaring the abnormal control pilot state.

10. The method of claim 9, wherein the first period of time is 50 μs.

11. The method of claim 9, wherein the protection message is sent out by an internal interrupt function of the control circuit.

* * * * *